US011947999B2

(12) United States Patent
Foo (10) Patent No.: US 11,947,999 B2
(45) Date of Patent: Apr. 2, 2024

(54) MULTI-PHASED AND MULTI-THREADED PROGRAM EXECUTION BASED ON SIMD RATIO

(71) Applicant: Imagination Technologies Limited, Kings Langley (GB)

(72) Inventor: Yoong Chert Foo, London (GB)

(73) Assignee: Imagination Technologies Limited, Kings Langley (GB)

( * ) Notice: Subject to any disclaimer, the term of this patent is extended or adjusted under 35 U.S.C. 154(b) by 399 days.

(21) Appl. No.: 16/805,727

(22) Filed: Feb. 29, 2020

(65) Prior Publication Data

US 2020/0201678 A1 Jun. 25, 2020

Related U.S. Application Data

(63) Continuation of application No. 15/056,866, filed on Feb. 29, 2016, now Pat. No. 10,585,700, which is a
(Continued)

(30) Foreign Application Priority Data

Dec. 16, 2010 (GB) ..................................... 1021414

(51) Int. Cl.
*G06F 15/80* (2006.01)
*G06F 9/30* (2018.01)
(Continued)

(52) U.S. Cl.
CPC .......... *G06F 9/4881* (2013.01); *G06F 9/3005* (2013.01); *G06F 9/3009* (2013.01);
(Continued)

(58) Field of Classification Search
CPC ........ G06F 9/3851; G06F 9/3887; G06F 9/46; G06F 9/4881; G06F 9/522; G06F 15/8007; G06T 1/20
See application file for complete search history.

(56) References Cited

U.S. PATENT DOCUMENTS 5,968,167 A 10/1999 Whittaker et al.
6,105,127 A 8/2000 Kimura et al.
(Continued)

FOREIGN PATENT DOCUMENTS

DE 102008020782 A1 11/2009
WO 2006-083291 A3 8/2006
WO 2010001736 A 1/2010

OTHER PUBLICATIONS

Son et al., "A Priority-Based Scheduling Algorithm for Real-Time Databases", Journal of Information Science and Engineering, 1995, 20 pages.*

(Continued)

*Primary Examiner* — David J. Huisman
(74) *Attorney, Agent, or Firm* — Potomac Law Group, PLLC; Vincent M DeLuca (57) ABSTRACT

A SIMD microprocessor is configured to execute programs divided into discrete phases. A scheduler is provided for scheduling instructions. A plurality of resources are for executing instructions issued by the scheduler, wherein the scheduler is configured to schedule each phase of the program only after receiving an indication that execution of the preceding phase of the program has been completed. By splitting programs into multiple phases and providing a scheduler that is able to determine whether execution of a phase has been completed, each phase can be separately scheduled and the results of preceding phases can be used to inform the scheduling of subsequent phases. In one example, different numbers of threads and/or different numbers of data instances per thread may be processed for different phases of the same program.

14 Claims, 5 Drawing Sheets

Related U.S. Application Data continuation of application No. 13/068,791, filed on May 19, 2011, now Pat. No. 9,304,812.

(51) Int. Cl.
| | |
|---|---|
| *G06F 9/38* | (2018.01) |
| *G06F 9/46* | (2006.01) |
| *G06F 9/48* | (2006.01) |
| *G06F 9/52* | (2006.01) |
| *G06F 15/78* | (2006.01) |
| *G06T 1/20* | (2006.01) |

(52) U.S. Cl.
CPC .......... *G06F 9/3851* (2013.01); *G06F 9/3887* (2013.01); *G06F 9/46* (2013.01); *G06F 9/522* (2013.01); *G06F 15/78* (2013.01); *G06F 15/8007* (2013.01); *G06T 1/20* (2013.01); *Y02D 10/00* (2018.01)

(56) References Cited

U.S. PATENT DOCUMENTS

| | | | |
|---|---|---|---|
| 6,128,712 | A | 10/2000 | Hunt et al. |
| 6,151,668 | A | 11/2000 | Pechanek et al. |
| 6,732,253 | B1 | 5/2004 | Redford |
| 6,897,871 | B1 | 5/2005 | Morein et al. |
| 7,010,787 | B2 | 3/2006 | Sakai |
| 7,058,945 | B2 | 6/2006 | Ichinose et al. |
| 7,327,369 | B2 | 2/2008 | Morein et al. |
| 7,366,878 | B1 | 4/2008 | Mills et al. |
| 7,518,993 | B1 | 4/2009 | Dennis |
| 7,542,043 | B1 | 6/2009 | Lindholm et al. |
| 7,742,053 | B2 | 6/2010 | Lefebvre et al. |
| 7,836,116 | B1 | 11/2010 | Goodnight et al. |
| 7,999,808 | B1 | 8/2011 | Aila et al. |
| 8,018,457 | B2 | 9/2011 | Peterson et al. |
| 8,065,288 | B1 | 11/2011 | Garland et al. |
| 8,174,531 | B1 | 5/2012 | Lindholm et al. |
| 8,405,665 | B2 | 3/2013 | Lindholm et al. |
| 8,499,305 | B2 | 7/2013 | Jiao |
| 8,615,762 | B2 | 12/2013 | Nishihata |
| 9,304,812 | B2 | 4/2016 | Foo |
| 2004/0107421 | A1 | 6/2004 | VoBa et al. |
| 2005/0097552 | A1 | 5/2005 | O'Connor et al. |
| 2008/0072015 | A1 | 3/2008 | Julier et al. |
| 2008/0098208 | A1 | 4/2008 | Reid et al. |
| 2008/0313435 | A1 | 12/2008 | Orion et al. |
| 2009/0089542 | A1 | 4/2009 | Laine et al. |
| 2009/0284523 | A1 | 11/2009 | Peterson et al. |
| 2009/0322752 | A1 | 12/2009 | Peterson et al. |
| 2010/0064291 | A1 | 3/2010 | Aila et al. |
| 2010/0077010 | A1 | 3/2010 | Aila et al. |
| 2012/0084477 | A1* | 4/2012 | Arndt .................. G06F 9/3004 710/266 |

OTHER PUBLICATIONS

Sugerman, "GRAMPS: A Programming Model for Graphics Pipelines", ACM Transactions on Graphics, vol. 28, No. 1, Article 4, Publication date: Jan. 2009, pp. 1-11.

Aamodt, T.M. "Architecting Graphics Processors for Non-Graphics Compute Acceleration," Communications, Computers and Signal Processing, IEEE ISBN 978-1-4244-4561(2009) p. 963-968.

Lindholm, E. et al. "NVIDIA Tesla: A Unified Graphics and Computing Architecture", IEEE Micro, IEEE Service Center ISSN 0272-1732 (2008), vol. 27, No. 2, p. 39-55.

(*Note: NPL in grandparent application).

* cited by examiner

MULTI-PHASED AND MULTI-THREADED PROGRAM EXECUTION BASED ON SIMD RATIO

CROSS-REFERENCE TO RELATED APPLICATIONS AND CLAIM OF PRIORITY

This application is a continuation under 35 U.S.C. 120 of application Ser. No. 15/056,866 filed Feb. 29, 2016, now U.S. Pat. No. 10,585,700, which is a continuation of prior application Ser. No. 13/068,791 filed May 19, 2011, now U.S. Pat. No. 9,304,812, which claims foreign priority under 35 U.S.C. 119 from United Kingdom Application No. 1021414.6 filed Dec. 16, 2010.

FIELD OF THE INVENTION

The present invention relates to the field of microprocessors and is particularly advantageous for single instruction multiple data (SIMD) processors.

BACKGROUND TO THE INVENTION

With some types of data, such as graphics data, large blocks of data often need to undergo the same processing operations. One example is when changing the brightness of an image. SIMD processing is advantageous for this process. A SIMD processor is a microprocessor with execution units, caches and memories as with any other processor, but additionally incorporates the concept of parallel execution of multiple data streams. Instead of individually fetching data instances, a single fetch instruction can be used to fetch a block of data. A single instruction can then be used to operate on the fetched data block, such as an "add" operation. SIMD processing therefore reduces the load on the processor as compared with traditional single instruction single data (SISD) processing.

However, SIMD processing can only be used in limited circumstances. For example, even in situations where large blocks of data are initially to be processed in the same way, programs often contain conditional instructions or branch instructions that result in some data in a block being operated on by one branch of instructions and the remaining data by another branch of instructions. It is very often not possible to predict in advance how many data instances will need to be processed by one branch and how many by another.

Typically in a SIMD processor, a scheduler is used to schedule the execution of a program, allocating the resources required by the program at the outset. One solution for programs in which different parts of a data set are processed by different instructions during a portion of the program has been to execute each branch on all of the data and then discard the unwanted results. Clearly this is an inefficient use of processor resources and time.

Accordingly, it would be desirable to be able to better allocate resources during the execution of programs in a SIMD processor, both to reduce power consumption and to optimise resource usage.

SUMMARY OF THE INVENTION

In a first aspect, the invention provides a microprocessor configured to execute programs divided into discrete phases, comprising:
a scheduler for scheduling program instructions to be executed on the processor; and
a plurality of resources for executing programming instructions issued by the scheduler;
wherein the scheduler is configured to schedule each phase of the program only after receiving an indication that execution of the preceding phase of the program has been completed.

Preferably, the processor is a multithreaded processor. Preferably, the processor is a SIMD processor. Preferably, the scheduler is configured to recalculate a SIMD ratio for each phase of the program. The SIMD ratio is the number of data instances processed by a single instruction.

The processor includes a feedback loop to the scheduler through which the completion of each phase of the program is communicated to the scheduler. Preferably the scheduler maintains a record for each phase of the program that is scheduled, during execution of that phase of the program.

Preferably, the processor further includes a thread finished counter, wherein when each thread finishes a phase of the program an indication is sent to the thread finished counter, and the processor is configured such that the scheduler schedules a next phase of the program only when the thread finished counter indicates that all threads for a preceding phase of the program have finished. The thread finished counter may be part of the scheduler or provided as a separate component. The thread finished counter may comprise a memory storing a number of threads for each phase of a program and the thread finished counter decremented each time a thread finishes a phase, and configured such that when the thread finished counter reaches zero, the scheduler is instructed to schedule the next phase of the program.

The thread finished counter may store a record of a number of data instances for each thread of a phase of a program.

Preferably, the scheduler is configured to dynamically allocate the number of threads for each phase of the program based on the results of a preceding phase.

In a second aspect, the invention provides a method for scheduling programs in a microprocessor, the microprocessor comprising a scheduler for scheduling programs of programming instructions, the programs being divided into discrete phases, the method comprising the steps of:
scheduling a first phase of a program to be executed on the processor; executing the first phase of the program scheduled by the scheduler;
when execution of the first phase of the program is complete, providing an indication to the scheduler that execution of the first phase of the program is complete;
scheduling a second phase of the program after the scheduler has received the indication that execution of the first phase of the program is complete.

Preferably, the method further comprises maintaining a record for each phase of the program that is scheduled, during execution of that phase of the program.

Preferably, the method further comprises updating the record when each thread finishes a phase of the program, and scheduling a next phase of the program only when the record indicates that all threads for a preceding phase of the program have finished.

Preferably, the method further comprises storing a record of a number of data instances for each thread of a phase of a program.

Preferably, the method further comprises dynamically allocating the number of threads for each phase of the program based on the results of a preceding phase.

In a third aspect, the invention provides a computer program product, comprising computer executable code in the form a program executable on a SIMD processor, wherein the program is divided into a plurality of phases by phase instructions, the phase instructions being provided at points in the program where branches may occur and allowing a scheduler to schedule each phase of the program separately. At these points the SIMD ratio may need to change. An example of a point at which the SIMD ratio may need to change is following a branch instruction or conditional instruction. Another example is a sub-routine for alpha blending or anti-aliasing in a graphics processing program.

BRIEF DESCRIPTION OF THE DRAWINGS

Embodiments of the invention will now be described in detail, by way of example only, with reference to the accompanying drawings, in which.

DETAILED DESCRIPTION

Figure 1:
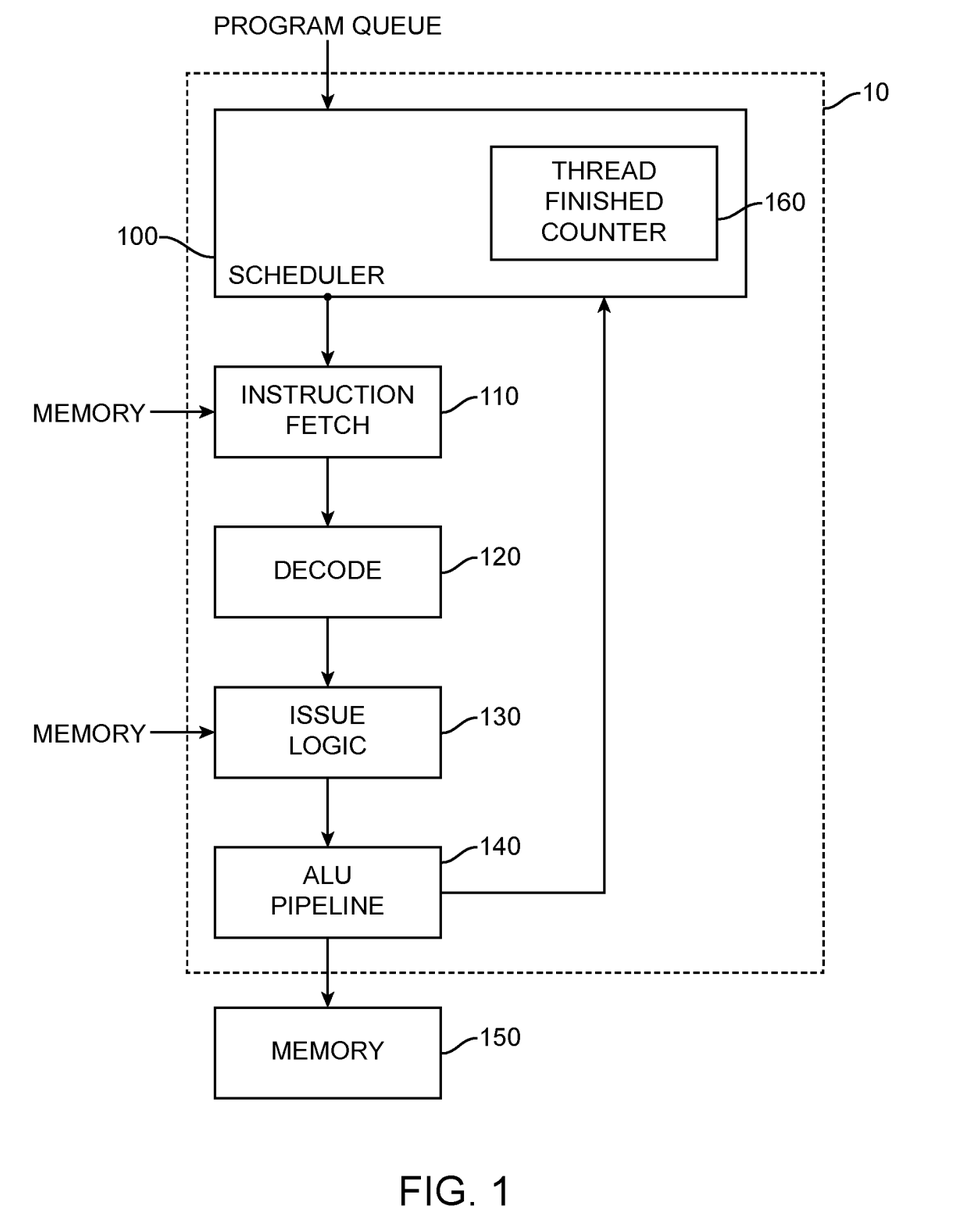
FIG. 1 is a schematic illustration of a processor in accordance with the present invention.
Figure 5:
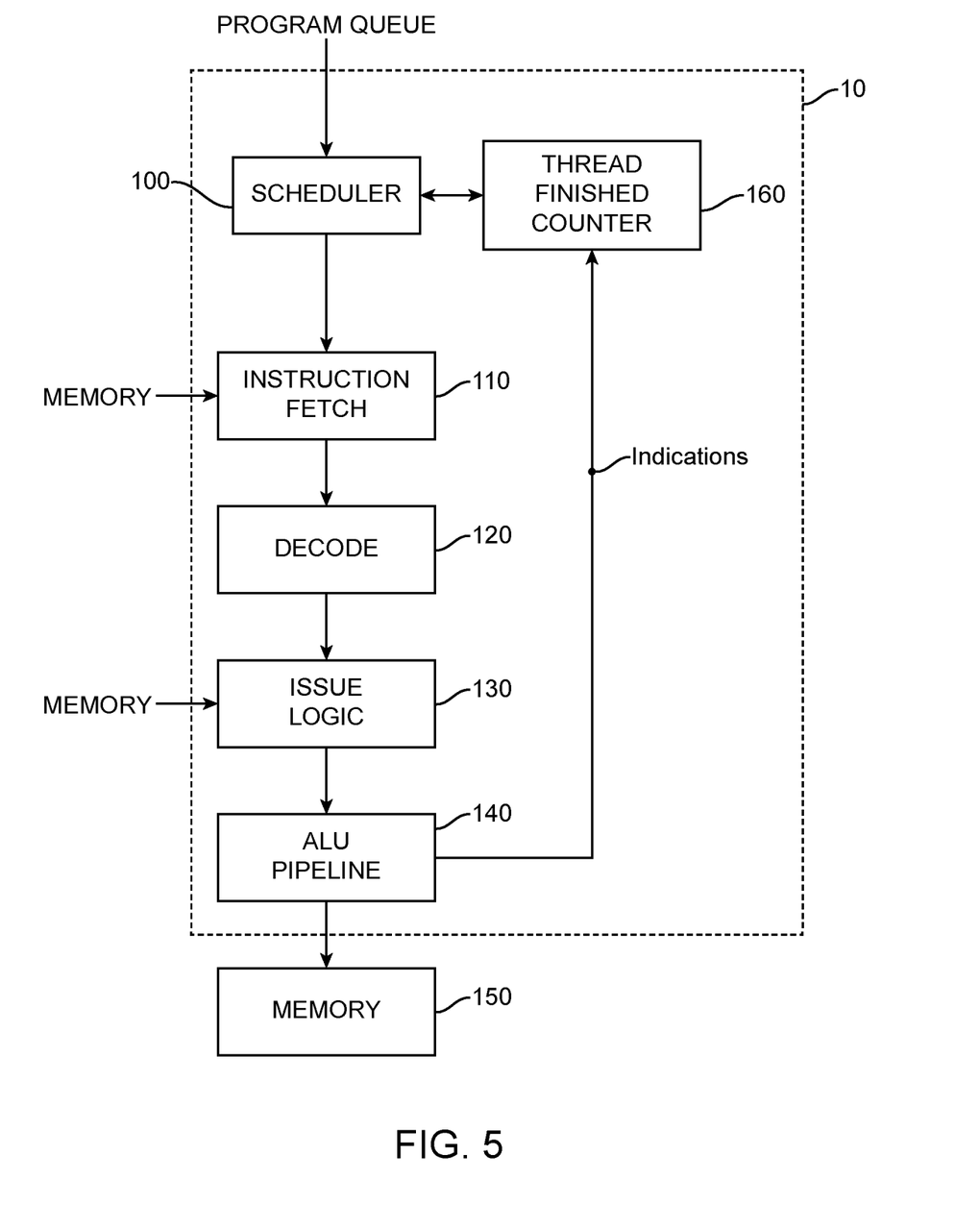
FIG. 5 is a schematic illustration of a processor in accordance with the present invention.

FIG. 1 is a schematic illustration of a multi-threaded SIMD processor 10 in accordance with an embodiment of the present invention. FIG. 5 is a schematic illustration of a multi-threaded SIMD processor 10 in accordance with another embodiment of the present invention; where the disclosures identify FIG. 1, such disclosures apply equally to FIG. 5, except that a thread finished counter is either in the scheduler 100 (FIG. 1) or provided as a separate component (FIG. 5). The processor is configured to schedule and execute individual phases of each program separate from one another, rather than scheduling a complete program all at once and then executing it.

As with conventional processors, following scheduling by the scheduler 100, instructions are fetched from memory by the instruction fetch units 110.

Fetched instructions are decoded by the instruction decode unit 120 and fed to the issue logic 130. The issue logic feeds the instructions and fetched data to the arithmetic logic units (ALUs) 140 and the results are stored in registers or memory 150.

The ALUs 140 are also configured to feed back thread finished instructions to the scheduler 100. As will be explained, thread finished instructions are provided at the end of each phase of a program.

New programs are provided to the scheduler 100 divided into multiple phases. The way in which the programs are divided is determined by the programmer but typically a new phase will begin at a point in the program when the resource requirements of the program may change.

For example, a program may include a conditional instruction such that if a data value is less than a threshold it is processed by one branch of instructions otherwise it is processed by another branch of instructions. It may not be possible to determine, before execution, whether all data instances being processed by the program will be processed by a single branch or whether the data will be split between the two branches and if so, how many data instances will go down which branch. So at the point of the conditional instruction the number of threads required and the number of instruction fetches required may change in a way that cannot be reliably predicted before execution. By splitting a program at such points, resource scheduling can be managed dynamically in response to the data results.

Another example of an advantageous point for a new program phase is a routine for blending background colour with a transparent foreground object in a graphics program. A foreground object may have a uniform colour and so the data instances for the entire object can be processed in the same way for a colour calculation. However, the background over which the object sits may have variable colour and so different portions of the object must be processed differently in a blending routine. The blending routine may therefore be advantageously placed in a separate phase of the program to the colour routine.

A further example of an advantageous point for a new program phase is an anti-aliasing routine. Anti-aliasing is used when representing a high resolution image on a lower resolution screen. To remove undesirable artefacts, such as jagged edges, an anti-aliasing routine is used to smooth out the image. But anti-aliasing is only required at the edges of graphics objects. If a block of uniform colour is in the image, it is not necessary to process the bulk of it at high resolution and perform anti-aliasing. Only at the boundaries with other objects is it necessary. So a program might include a branch instruction so that edge portions of image data are processed using the anti-aliasing routine while larger blocks of data are processed in a much less computationally expensive way.

The programs are divided into phases by the inclusion of "phase completed" instructions at the end of each phase of the program. The phase completed instructions when executed feed back to the scheduler 100 an indication that a phase as been completed. The phase completed instructions include a program identifier.

The program instructions also include an indication of the resource requirements of the program, but instead of being provided at the start of the program to cover the entire program, they are provided at the beginning of each phase of the program. The scheduler 100 can then assess if there are sufficient resources available to execute the phase. Because the resources required may depend on the outcome of a preceding phase, the indication of the resources required may be in the form an algorithm to calculate the resources required. This dynamic calculation of resource requirements removes the need to always provision for the worst case scenario and leads to more efficient resource allocation.

The scheduler 100 includes a multi-phased execution control unit or thread finished counter 160 that stores a record for each program scheduled, and the number of threads scheduled for the current phase. At the start of a new program the scheduler creates a new record in the thread finished counter 160, and updates it every time a new phase of that program is scheduled. As each thread finishes a phase of a program the thread finished counter 160 receives an indication and adjusts the record for the number of threads executing for that phase of that program. The count of threads for a phase of that program is simply decremented each time a thread finishes the phase until the thread count reaches zero. When the thread count for the phase of that program reaches zero, a new phase of that program can be scheduled. The thread finished counter 160 may be provided as part of the scheduler or as a separate component. FIG. 1 depicts thread finished counter 160 as part of scheduler 100 and FIG. 5 depicts thread finished counter 160 as a separate component.

Figure 2:
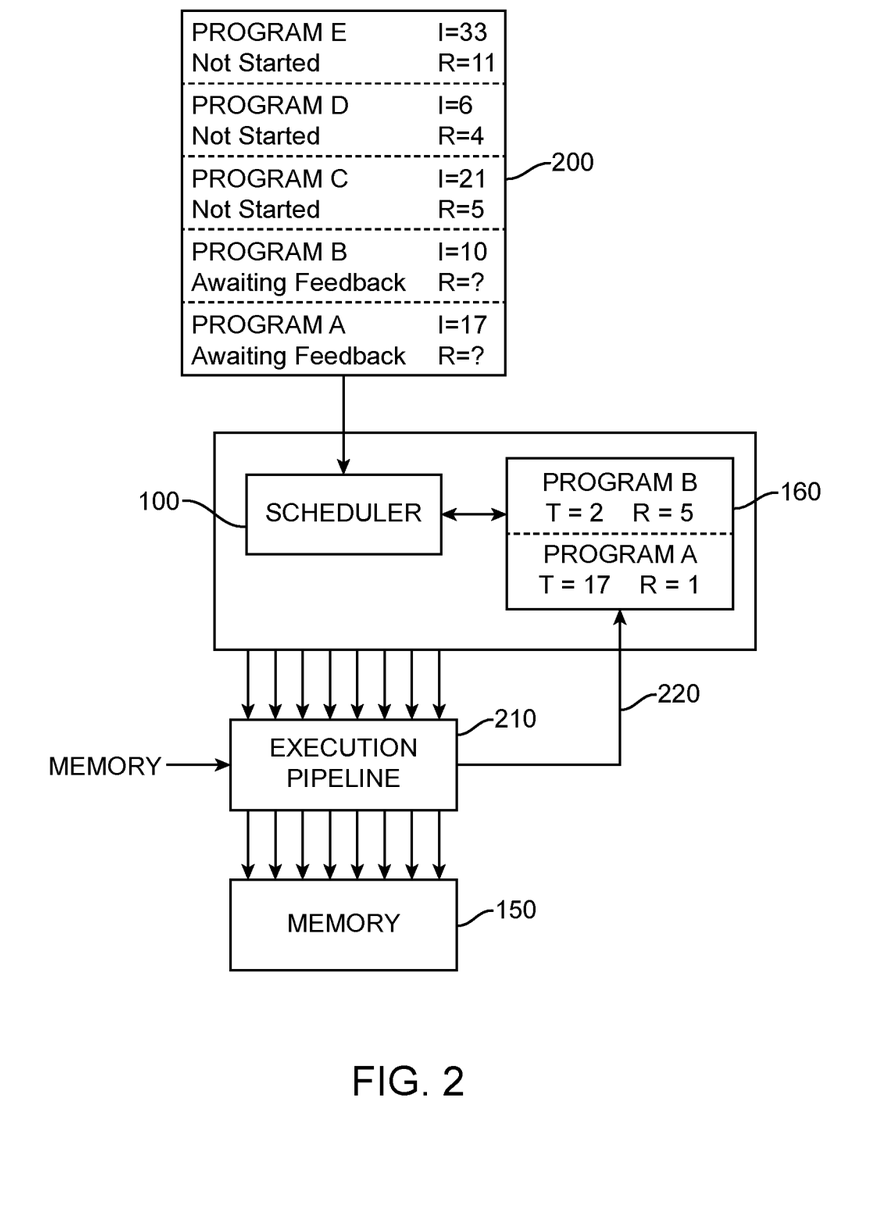
FIG. 2 is a schematic illustration of a program scheduling scheme in accordance with the present invention.

FIG. 2 is a schematic illustration of scheduling and execution process in accordance with the present invention showing the content of a program queue and a thread finished counter. A stream of programs is provided in a program queue as an input to a scheduler. The programs 200 are each divided into phases as described above, and each program has a predetermined number of data instances, indicated as the value I in the program queue. The number of instances per thread is indicated by the value R. The scheduler 100 schedules an individual phase of a program and waits for an indication that that phase is complete before scheduling the next phase of that program. In the example shown in FIG. 2 there are three programs in the program queue not yet scheduled and two programs, program A and program B, currently being executed, but with further phases remaining to be scheduled. The number of instances per thread, R, is known for the initial phase of each program but may be altered for subsequent phases of the program depending on the outcome of preceding phases. So the value of R is not known for the phases of programs A and B yet to be scheduled.

The phase of program A being executed has 17 threads, indicated in the thread finished counter 160 by the value T. Each thread contains a single data instance, so R=1. The phase of program B being executed has 2 threads each with 5 instances per thread. FIG. 2 shows multiple threads scheduled by the scheduler entering the execution pipeline 210. The execution pipeline comprises the instruction fetch, issue logic and ALUs shown in FIG. 1.

As already described with reference to FIG. 1, the thread finished counter 160 stores a record for each program scheduled, and the number of threads scheduled for the current phase. As each thread finishes a phase the thread finished counter 160 receives an indication 220 from the end of the execution pipeline 210 and adjusts the record for the number of threads executing for that program. The count of threads T for a program is simply decremented each time a thread finishes until the thread count reaches zero. When the thread count for a program reaches zero, a new phase of that program can be scheduled.

Figure 3:
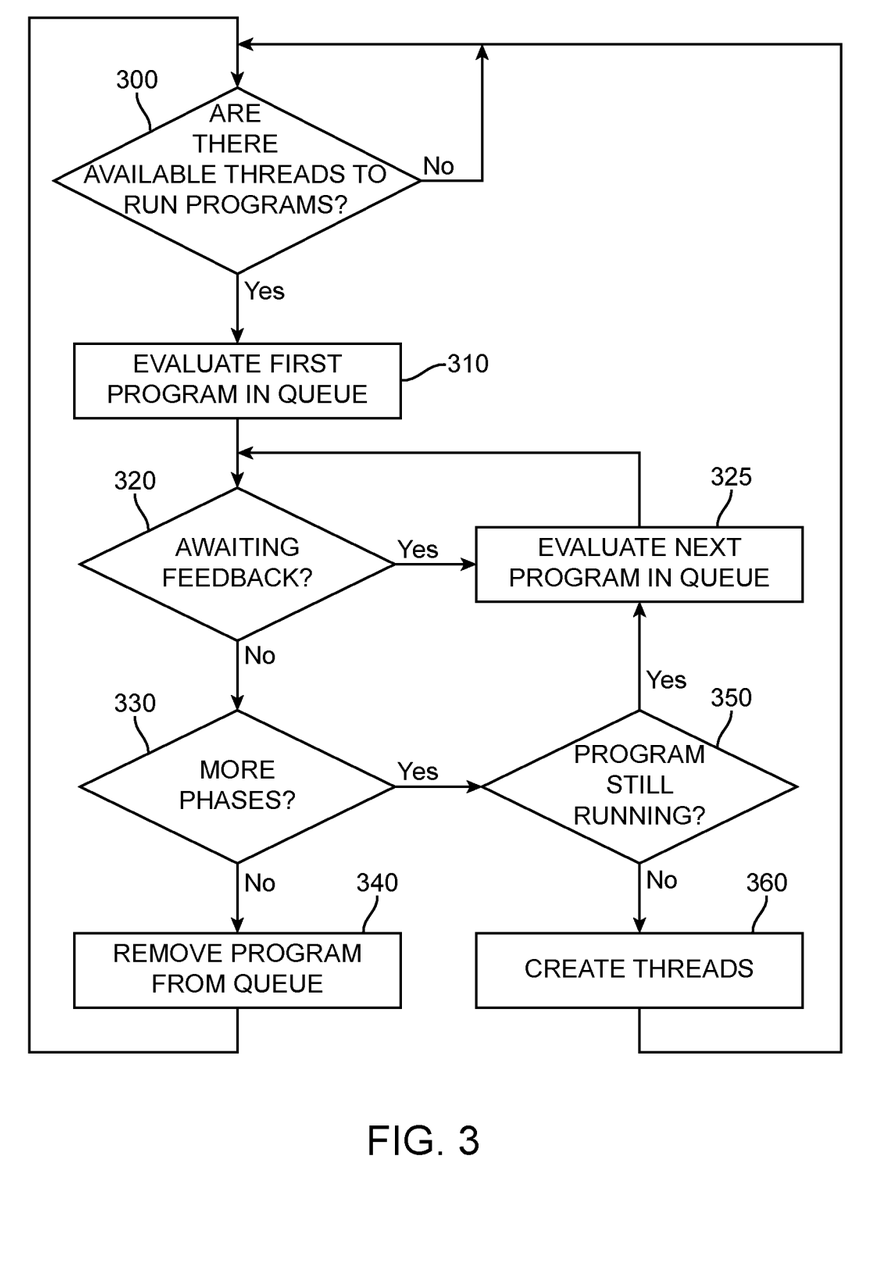
FIG. 3 is a flow diagram illustrating the steps carried out by the scheduler of FIG. 2.

FIG. 3 is a flow diagram showing the process steps carried out by the scheduler in deciding how to schedule new threads. In step 300 the scheduler first checks if there are threads available for running a program from the program queue that are available to run. If there are no threads available, the scheduler continues to check until there are threads available.

If there are threads available, the first program in the queue is evaluated in step 310. In step 320, the scheduler checks if the first program already has a phase running and the scheduler is waiting for feedback to indicate that the phase is completed. If so then in step 325, the next program in the queue is evaluated in the same manner. If the scheduler is not awaiting feedback from a phase of the first program, then in step 330 the scheduler assesses whether there are any further phases to execute. If there are no further phases the program is removed from the queue, as shown in step 340, and its record removed from thread finished counter.

If there are more phases left to run the scheduler determines whether the program is still running in step 350. If the program is still running, the scheduler moves to step 325 and next program in the queue is evaluated. If the program is not still running, the scheduler creates new threads for the next phase of the program, as indicated by step 360. Following the creation of new threads, the scheduler returns to the step 300 to check if there is room for any further threads.

Figure 4:
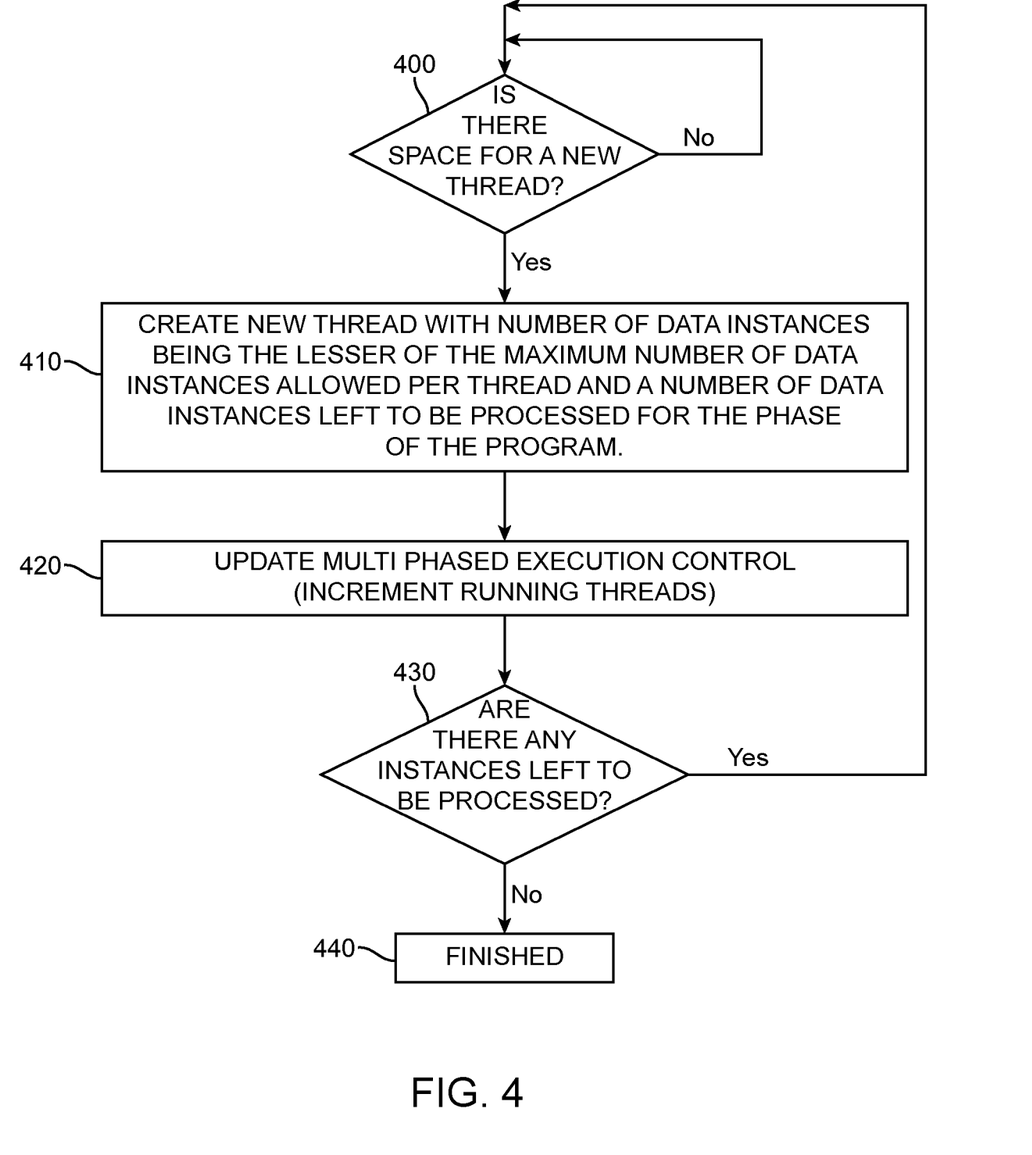
FIG. 4 is a flow diagram illustrating the process carried out by the scheduler for scheduling new threads.

FIG. 4 shows in detail the steps taken by the scheduler to create new threads in step 360. In a first step, step 400, the scheduler checks that there is space for a new thread. If not, the scheduler continues to check until space becomes available. When space for a new thread is available, the scheduler creates a new thread, shown as step 410. The number of data instances in the new thread is the lesser of the maximum number of instances allowed per thread (which is limited by the hardware) and the number of data instances left.

Once the new thread has been created, a record for the thread is created or updated in the multi phased execution control unit, and increments a count of the running threads, shown as step 420.

In step 430 the scheduler assesses whether there are further data instances to be processed in the phase. If so, the scheduler attempts to create a further thread or threads to accommodate them. If not, the thread creation process ends in step 440 and the scheduler returns to step 300.

The present invention allows the SIMD ratio of programs to be dynamically altered during program execution. By splitting programs into multiple phases and providing a scheduler that is able to determine whether execution of a phase has been completed, each phase can be separately scheduled and the results of preceding phases can be used to inform the scheduling of subsequent phases.

What is claimed is:

1. A multithreaded single instruction multiple data (SIMD) microprocessor configured to execute a program divided into discrete phases of programming instructions by phase instructions, the phase instructions being provided at points in the program where resource requirements of the program change, the microprocessor configured such that a plurality of data instances can be processed by a single thread of programming instructions, the microprocessor comprising:
a scheduler for scheduling phases of the program to be executed on the microprocessor wherein the phase instructions allow the scheduler to schedule each phase of the program separately; and
a plurality of resources for executing a phase of programming instructions in the form of one or more threads issued by the scheduler;
wherein the scheduler is configured during scheduling of each phase of the program subsequent to a first phase to determine a number of threads and a number of data instances to be allocated to each of the determined number of threads for that phase of the program based on a maximum number of data instances allowed per thread and on a result of a preceding phase of the program.

2. The SIMD microprocessor according to claim 1, wherein the maximum number of data instances allowed per thread is limited by the hardware.

3. The SIMD microprocessor according to claim 1, wherein the scheduler maintains a record for each program that is scheduled, during execution of that program.

4. The SIMD microprocessor according to claim 1, further including a thread finished counter, wherein when each thread finishes a phase of the program an indication is sent to the thread finished counter, and wherein the microprocessor is configured such that the scheduler schedules a next phase of the program only when the thread finish counter indicates that all threads for a preceding phase of the program have finished.

5. The SIMD microprocessor according to claim 4, wherein the thread finished counter is part of the scheduler.

6. The SIMD microprocessor according to claim 4, wherein the thread finished counter comprises a memory storing a number of threads for each phase of a program and the microprocessor is configured such that the thread finished counter is decremented each time a thread finishes a phase, and when the thread finished counter reaches zero, the scheduler is instructed to schedule the next phase of the program.

7. The SIMD microprocessor according to claim 4, wherein the thread finished counter stores a record of a number of data instances for each thread of a phase of a program.

8. A method for scheduling a program in a multithreaded, single instruction multiple data (SIMD) microprocessor, the microprocessor comprising a scheduler for scheduling a program divided into discrete phases of programming instructions by phase instructions being provided at points in the program where resource requirements of the program change, the method comprising the steps of:
   scheduling a first phase of the program in the form of one or more threads to be executed on the microprocessor, including the step of determining how many data instances to allocate to each of the one or more threads in the first phase;
   executing the first phase of the program scheduled by the scheduler;
   when execution of the first phase of the program is complete, providing an indication based on the phase instructions to the scheduler that execution of the first phase of the program is complete; and
   scheduling a second phase of the program after the scheduler has received the indication that execution of the first phase of the program is complete, including the step of determining a number of threads and how many data instances to allocate to each of the determined number of threads in the second phase based on a maximum number of data instances allowed per thread and on a result of the first phase of the program.

9. A method according to claim 8, wherein the maximum number of data instances allowed per thread is limited by hardware.

10. A method according to claim 8, further comprising maintaining a record for each phase of the program that is scheduled, during execution of that phase of the program.

11. A method according to claim 10, further comprising updating the record when each thread finishes a phase of the program, and scheduling a next phase of the program only when the record indicates that all threads for a preceding phase of the program have finished.

12. A method according to claim 8 further comprising storing a record of a number of data instances for each thread of a phase of a program.

13. A method according to claim 8, further comprising dynamically allocating the number of threads for the second phase of the program based on a result of the first phase of the program.

14. A non-transitory machine readable medium having stored thereon a program for performing, when executed on a single instruction multiple data (SIMD) microprocessor, a method for scheduling a program in the single instruction multiple data microprocessor, the microprocessor comprising a scheduler for scheduling a program divided into discrete phases of programming instructions by phase instructions being provided at points in the program where resource requirements of the program change, the method comprising the steps of:
   scheduling a first phase of the program in the form of one or more threads to be executed on the processor, including the step of determining how many data instances to allocate to each of the one or more threads in the first phase;
   executing the first phase of the program scheduled by the scheduler;
   when execution of the first phase of the program is complete, providing an indication based on the phase instructions to the scheduler that execution of the first phase of the program is complete; and
   scheduling a second phase of the program after the scheduler has received the indication that execution of the first phase of the program is complete, including the step of determining a number of threads and how many data instances to allocate to each of the determined number of threads in the second phase based on a maximum number of data instances allowed per thread and on a result of the first phase of the program.

\* \* \* \* \*